US010866217B2

(12) United States Patent
Yasunaga (10) Patent No.: US 10,866,217 B2
(45) Date of Patent: Dec. 15, 2020

(54) LIQUID CHROMATOGRAPH FLOW PATH SWITCHING AND CONTROL SYSTEM FOR COLUMNS TO A DETECTOR

(71) Applicant: Shimadzu Corporation, Kyoto (JP)

(72) Inventor: Kenichi Yasunaga, Uji (JP)

(73) Assignee: Shimadzu Corporation, Kyoto (JP)

( * ) Notice: Subject to any disclaimer, the term of this patent is extended or adjusted under 35 U.S.C. 154(b) by 180 days.

(21) Appl. No.: 15/936,529

(22) Filed: Mar. 27, 2018

(65) Prior Publication Data

US 2018/0284079 A1    Oct. 4, 2018

(30) Foreign Application Priority Data

Mar. 30, 2017   (JP) ................................ 2017-068461

(51) Int. Cl.
*G01N 30/32* (2006.01)
*G01N 30/46* (2006.01)
(Continued)

(52) U.S. Cl.
CPC .............. *G01N 30/32* (2013.01); *G01N 30/20* (2013.01); *G01N 30/466* (2013.01);
(Continued)

(58) Field of Classification Search
CPC ......... G01N 30/46; G01N 30/466–468; G01N 2030/628; G01N 30/24;
(Continued)

(56) References Cited

U.S. PATENT DOCUMENTS 6,318,157 B1 * 11/2001 Corso .................. G01N 30/466
                                                    210/198.2
6,607,921 B1 *  8/2003 Hindsgaul ............ G01N 33/538
                                                    210/198.2
(Continued)

FOREIGN PATENT DOCUMENTS

JP      2008-256652 A     10/2008
JP      2015-166724 A      9/2015
WO      WO-0188528 A2 *   11/2001 ............. G01N 33/34

OTHER PUBLICATIONS

First Japanese Office Action dated Jun. 2, 2020 for the corresponding Japanese Patent Application No. 2017-068461, with its machine translation.

*Primary Examiner* — David L Singer
(74) *Attorney, Agent, or Firm* — Muir Patent Law, PLLC (57) ABSTRACT

A liquid chromatograph includes a plurality of columns, fluid supply units each configured to feed a predetermined solution in parallel with inlet side flow paths of the plurality of columns, a sample injection unit capable of selectively injecting a sample into one of the inlet side flow paths of the plurality of columns, and a flow path switching unit disposed on exit sides of the plurality of columns and configured to selectively connect one of outlet side flow paths of the plurality of columns to a flow path connected to a detector arranged on a downstream side of the flow path switching unit and connect outlet side flow paths of other columns to a waste liquid flow path. The liquid chromatograph may improve a throughput by shortening a time required for a series of measurements in which a sample is measured under a plurality of conditions by alternatively using a plurality of columns.

11 Claims, 4 Drawing Sheets

(51) Int. Cl.
*G01N 30/20* (2006.01)
*G01N 30/02* (2006.01)
*G01N 30/62* (2006.01)
*G01N 30/34* (2006.01)

(52) U.S. Cl.
CPC .......... *G01N 30/468* (2013.01); *G01N 30/34* (2013.01); *G01N 2030/027* (2013.01); *G01N 2030/201* (2013.01); *G01N 2030/324* (2013.01); *G01N 2030/628* (2013.01)

(58) Field of Classification Search
CPC .......... G01N 2030/201–202; G01N 2030/347; G01N 30/20; G01N 30/32; G01N 30/34; G01N 2030/324; G01N 2030/027; B01D 15/1821
See application file for complete search history.

(56) References Cited

U.S. PATENT DOCUMENTS

| | | | | |
|---|---|---|---|---|
| 6,641,783 B1* | 11/2003 | Pidgeon | ............... | G01N 30/20 210/656 |
| 2002/0020670 A1* | 2/2002 | Petro | ............... | G01N 35/1097 210/656 |
| 2003/0168392 A1* | 9/2003 | Masuda | ............... | G01N 30/463 210/198.2 |
| 2003/0172724 A1* | 9/2003 | Petro | ............... | G01N 30/6017 73/61.52 |
| 2005/0218055 A1* | 10/2005 | Hayashi | ............... | G01N 30/463 210/198.2 |
| 2006/0127284 A1* | 6/2006 | Mallet | ............... | G01N 35/0092 422/130 |
| 2006/0156792 A1* | 7/2006 | Wang | ............... | G01N 30/463 73/23.37 |
| 2007/0131615 A1* | 6/2007 | Moran | ............... | F16K 7/126 210/656 |
| 2008/0044309 A1* | 2/2008 | Yamashita | ............... | G01N 30/08 422/52 |
| 2009/0218286 A1* | 9/2009 | Bisschops | ............... | G01N 30/468 210/656 |
| 2010/0144028 A1* | 6/2010 | Bisschops | ............... | B01D 15/1807 435/320.1 |
| 2011/0232373 A1* | 9/2011 | Desmet | ............... | B01D 15/1864 73/61.56 |
| 2013/0018598 A1* | 1/2013 | Ohashi | ............... | G01N 30/34 702/25 |
| 2013/0248451 A1* | 9/2013 | Hall | ............... | B01D 15/18 210/659 |
| 2013/0260419 A1* | 10/2013 | Ransohoff | ............... | B01D 15/1821 435/69.6 |
| 2014/0157878 A1* | 6/2014 | Ohashi | ............... | G01N 30/34 73/61.56 |
| 2014/0251911 A1* | 9/2014 | Skudas | ............... | B01D 15/363 210/656 |
| 2015/0019141 A1* | 1/2015 | Ohashi | ............... | B01D 15/08 702/25 |
| 2015/0253293 A1* | 9/2015 | Ohashi | ............... | G01N 30/02 702/25 |
| 2015/0253294 A1* | 9/2015 | Ohashi | ............... | G01N 30/26 73/61.57 |
| 2015/0253295 A1* | 9/2015 | Ohashi | ............... | G01N 30/32 73/61.56 |
| 2016/0136543 A1* | 5/2016 | Shibuya | ............... | B01D 15/1885 210/198.2 |
| 2016/0310870 A1* | 10/2016 | Olovsson | ............... | B01D 15/1814 |
| 2017/0153210 A1* | 6/2017 | Eriksson | ............... | B01D 15/34 |

* cited by examiner

| | Column | Mobile phase | Flow rate | ... |
|---|---|---|---|---|
| Method 1 | Analysis column 17 of measurement block 10 | Gradient a | Flow rate A | ... |
| Method 2 | Analysis column 27 of measurement block 20 | Gradient a | Flow rate A | ... |
| Method 3 | Analysis column of measurement block 30 | Gradient b | Flow rate A | ... |
| Method 4 | Analysis column of measurement block 40 | Gradient b | Flow rate A | ... |
| Method 5 | Analysis column of measurement block 50 | Gradient c | Flow rate A | ... |
| Method 6 | Analysis column of measurement block 60 | Gradient c | Flow rate A | ... |

FIG. 3

| Time zone | 1 | 2 | 3 | 4 | 5 | 6 | |
|---|---|---|---|---|---|---|---|
| Measurement block 10 | Equilibration | | Measurement | Column washing | | | ... |
| | | Sample introduction | Flow path washing | | | | |
| Measurement block 20 | | | Equilibration | | Measurement | Column washing | |
| | | | | Sample introduction | Flow path washing | | |
| Measurement block 30 | | | | | Equilibration | | |
| | | | | | | Sample introduction | |

LIQUID CHROMATOGRAPH FLOW PATH SWITCHING AND CONTROL SYSTEM FOR COLUMNS TO A DETECTOR

TECHNICAL FIELD

The present invention relates to a liquid chromatograph, and more particularly to a liquid chromatograph that measures a sample under a plurality of conditions by alternatively using a plurality of measurement blocks each equipped with a fluid supply unit and a column.

BACKGROUND ART

In a liquid chromatograph, a sample is introduced into a column together with a mobile phase, and the components in the liquid sample are separated temporally in the column and measured.

The liquid chromatograph is equipped with a fluid supply unit for sending a mobile phase, an autosampler for introducing a liquid sample in the mobile phase, a column for temporally separating components in the liquid sample, and a detection unit for measuring separated components. Depending on the polarity, etc., of the components included in the liquid sample, the type of the mobile phase and the column with which each component can be separated is different (see, for example, Patent Document 1).

In one liquid chromatograph, it takes time and effort to replace the fluid supply unit for sending a mobile phase and/or the column every time a liquid sample is measured. However, if it is attempted to separately prepare a liquid chromatograph used for measuring a liquid sample including a component high in polarity and a liquid chromatograph used for measuring a liquid sample including a component low in polarity, costs will be increased. Especially, if a plurality of autosamplers and/or a plurality of mass spectrometers which are one of detectors are provided, the cost becomes high.

Under the circumstances, the so-called dual liquid chromatograph mass spectrometry system has been conventionally used in which two measurement blocks each equipped with a fluid supply unit and a column are provided and the aforementioned two measurement blocks share an autosampler and a mass spectrometer.

Figure 5A:
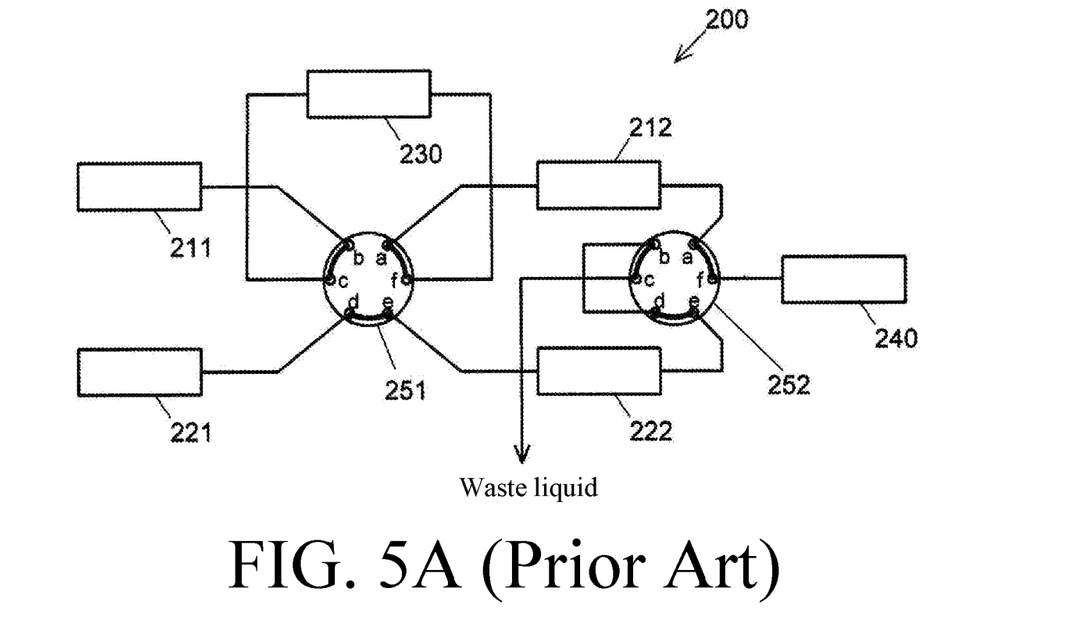
FIGS. 5A and 5B show an example of a flow path configuration of a conventional liquid chromatograph.
Figure 5B:
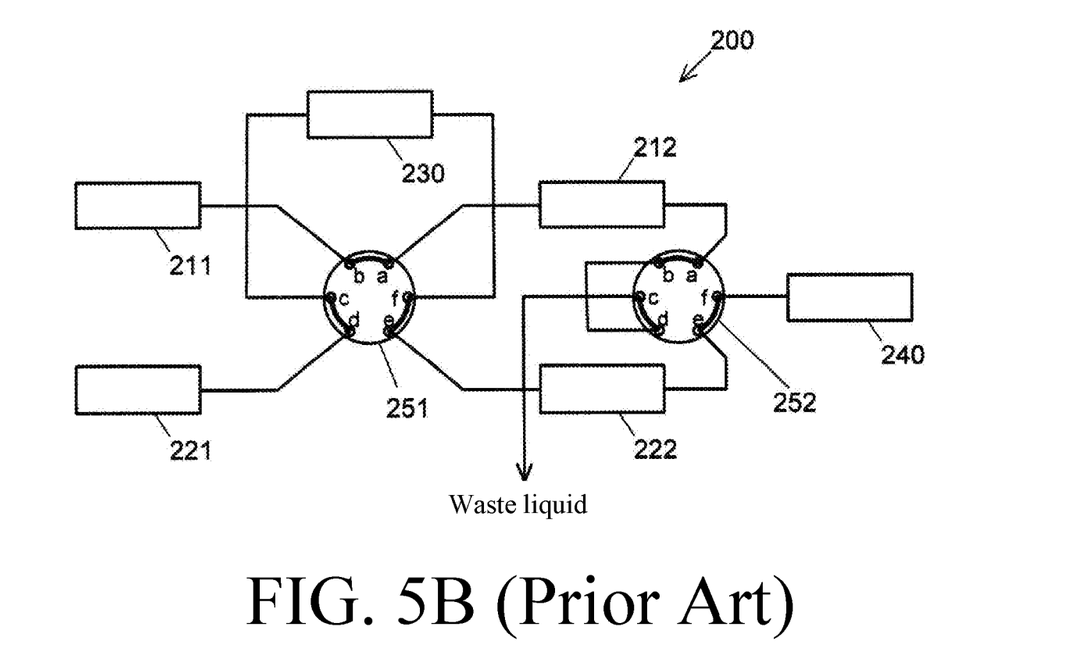

FIGS. 5A and 5B show a main configuration of a dual liquid chromatograph mass spectrometry system. This system is equipped with a first measurement block including a first fluid supply unit 211 and a first column 212 and a second measurement block including a second fluid supply unit 221 and a second column 222. These two measurement blocks share an autosampler 230 and a detector 240. A first six-way valve 251 and a second six-way valve 252 are connected to the autosampler 230 and the detector 240, respectively. By switching the flow paths of these six-way valves 251 and 252, it is possible to switch between a flow path (FIG. 5A) capable of performing a measurement using the first measurement block and a flow path FIG. 5B) capable of performing a measurement using the second measurement block.

PRIOR ART

Patent Document
Patent Document 1: Japanese Unexamined Patent Application Publication No. 2015-166724

SUMMARY OF THE INVENTION

Problems to be Solved by the Invention

There are wide varieties of characteristics of components contained in a sample to be analyzed by a liquid chromatograph. In order to analyze these components with a high degree of accuracy, it is necessary to consider not only the polarities of the components but also various characteristics, such as, e.g., hydrophilicity/hydrophobicity and molecular size. However, in a conventional liquid chromatograph mass spectrometry system as shown in FIGS. 5A and 5B, there was a problem that only two measurement blocks different in column and mobile phase can be used. Although the case of using a mass spectrometer as a detector was exemplified, there is also the same problem as mentioned above even when other detectors, such as, e.g., an absorptiometer, are used.

An object to be solved by the present invention is to provide a liquid chromatograph capable of sharing an autosampler and a detector with three or more measurement blocks each including a column corresponding to a property of a liquid sample of a measurement target and capable of sending a mobile phase to the column.

Means for Solving the Problems

A liquid chromatograph according to the present invention, which was made to solve the above problem, includes:
  a) a plurality of columns which are three or more columns;
  b) fluid supply units provided at respective inlet side flow paths of the plurality of columns and each configured to feed a predetermined solution;
  c) a sample injection unit capable of selectively injecting a sample into one of the inlet side flow paths of the plurality of columns; and
  d) a flow path switching unit disposed on exit sides of the plurality of columns and configured to selectively connect one of outlet side flow paths of the plurality of columns to a flow path connected to a detector arranged on a downstream side of the flow path switching unit and connect outlet side flow paths of other columns to a waste liquid flow path.

In the liquid chromatograph according to the present invention, first, the flow path switching unit is operated so that the outlet side flow path of the column (measurement column) to be used for measurement among the plurality of columns is connected to the flow path connected to the detector. Then, a predetermined solution (e.g., a mobile phase) is sent in parallel to each of inlet side flow paths of the plurality of columns which is three or more columns. Further, a sample is injected into the inlet side flow path of the measurement column from the sample injection unit.

In this way, the sample is introduced into the measurement column together with the mobile phase, and various components contained in the sample are temporally separated within the measurement column. The components eluted from the measurement column are sequentially measured by the detector.

During the time, a predetermined solution (e.g., a mobile phase) is also sent to two or more columns (standby columns) other than the measurement column among the plurality of columns. Therefore, in parallel with the measurement of the sample using the measurement column, the standby columns are subjected to predetermined processing (e.g., equilibration).

Here, the case in which the predetermined solution is a mobile phase is exemplified, but it is also possible to perform processing, such as, e.g., washing the column by sending a cleaning solution.

In the conventional liquid chromatograph as shown in FIGS. 5A and 5B, since the 2-position 6-way valve 252 was used, it was only possible to switch the flow path between two measurement blocks (columns). On the other hand, in the liquid chromatograph according to the present invention, a flow path switching unit based on a new idea is used in which one of outlet side flow paths of a plural columns is alternatively connected to a detector and all other outlet side flow paths are connected to a drainage path. That is, it is configured such that all columns other than the column used for a measurement are connected to the waste liquid flow path irrespective of the number of columns, in other word, the number of usable columns is not limited.

Incidentally, in the configuration shown in FIGS. 5A and 5B, if, for example, a 7-port 6-position valve (a valve equipped with one common port and six peripheral ports) is used instead of a 2-position 6-way valve 252 and the outlets of the columns are connected to the respective six peripheral ports, it becomes possible to alternatively connect one of the outlet side flow paths of the six columns to the detector. However, in this case, a mobile phase, etc., cannot be sent to the other five columns in the middle of measuring a sample using one measurement column, and therefore, equilibration of the measurement column, washing, and a sample measurement had to be repeated in this order every time the measurement column was switched. In contrast, in the liquid chromatograph according to the present invention, since the flow path switching unit having the aforementioned characteristics is used, in parallel to the measurement of the sample, it is possible to equilibrate a standby column (equilibrate a column to be used in the next measurement) or wash (wash the column used in the previous measurement). For this reason, immediately after switching the measurement column, it is possible to measure the sample, which can improve the throughput of the measurement.

The liquid chromatograph according to the present invention may be configured to further include:

e) a storage unit in which a plurality of measurement conditions for measuring a sample by alternatively using the plurality of columns is stored; and f) a measurement control unit configured to sequentially read out the plurality of measurement conditions from the storage unit, control the flow path switching unit so as to connect the outlet side flow path of the column used in the measurement condition to a flow path connected to the detector, and control the sample injection unit so as to inject a sample into the inlet side flow path of the column.

In the liquid chromatograph of this embodiment, the measurement column is automatically connected to the detector based on the plurality of measurement conditions previously stored in the storage unit by a user, and the sample is automatically injected into the measurement column. For this reason, it is possible to measure the sample more efficiently.

Effects of the Invention

By using the liquid chromatograph of the present invention, an autosampler and a detector can be shared with three or more measurement blocks each including a column corresponding to a property of a liquid sample of a measurement target and configured to send a mobile phase to the column.

EMBODIMENTS FOR CARRYING OUT THE INVENTION

Hereinafter, embodiments of a liquid chromatograph according to the present invention will be described with reference to the drawings. The liquid chromatograph of this embodiment is composed of a liquid chromatograph 1 and a control unit 2.

Figure 1:
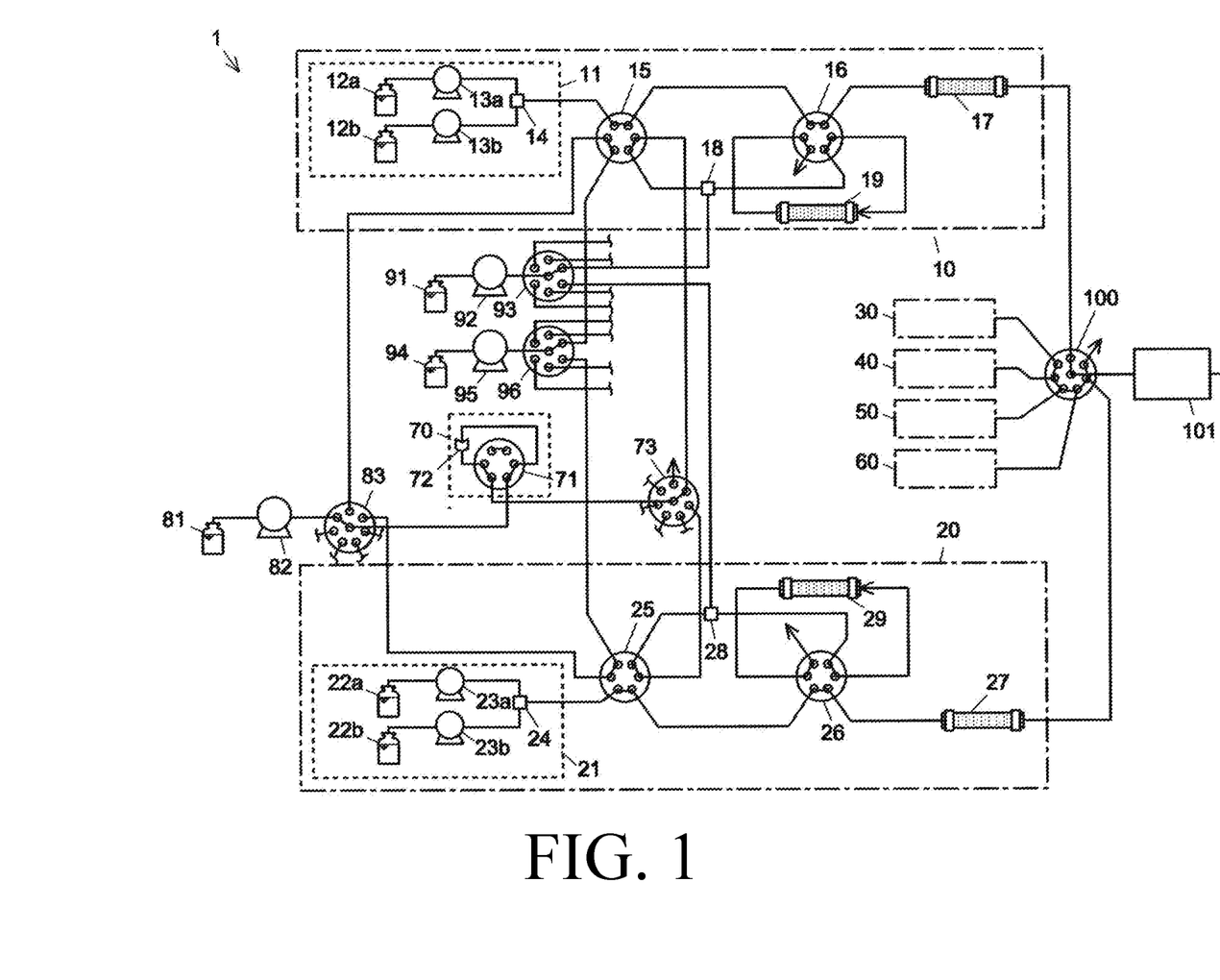
FIG. 1 is a flow path configuration diagram of one example of a liquid chromatograph according to the present invention.

FIG. 1 is a flow path configuration diagram of the liquid chromatograph 1 according to this embodiment. This liquid chromatograph 1 is equipped with six measurement blocks 10 to 60, and is configured to measure a sample by alternatively using one of these measurement blocks. Although only the internal configurations of two measurement blocks 10 and 20 are shown in FIG. 1, the other measurement blocks 30 to 60 each have the same configuration as those of the two measurement blocks. It should be noted that the illustration of portions of the flow paths extending from the ports on the outer circumferences of the 7-port 6-position valves 93 and 96 (flow paths extending to the measurement blocks 30 to 60) and the illustration of portions of the flow paths extending from ports on the outer circumferences of the 8-port 7-position valves 73 and 83 (flow paths extending to the measurement blocks 30 to 60) are omitted. Also note that the flow paths indicated by the arrows in the 6-port 2-position valves 16 and 26 and the 8-port 7-position valve 73 and 100 each are a waste liquid flow path.

The internal structure of the measurement block will be explained with reference to the measurement block 10 as an example. The measurement block 10 includes a mobile phase supply unit 11, two 6-port 2-position valves 15 and 16, an analysis column 17, a flow path connecting portion 18, and a preprocessing column 19. In the mobile phase supply unit 11, solutions contained in liquid containers 12a and 12b are sent by liquid delivery pumps 13a and 13b, mixed at a mixer 14, and sent to one of the ports of the 6-port 2-position valve 15. In the flow path connection state shown in FIG. 1, the mobile phase sent to the 6-port 2-position valve 15 is further sent to the analysis column 17 through the 6-port 2-position valve 16.

A sample is introduced from an autosampler 70 equipped with a 6-port 2-position valve 71 and an injection port 72.

In the flow path connection state shown in FIG. 1, a sample introduction solution accommodated in a liquid container 81 is sent by a liquid delivery pump 82, flows through an 8-port 7-position valve 83, and flows into the autosampler 70. Then, the sample collected and weighed in the autosampler 70 passes through the 8-port 7-position valve 73 and flows from the 6-port 2-position valve 15 to the measurement block 10.

Subsequently, in the flow path connecting portion 18, the sample joins a diluent contained in a liquid container 91 and sent by a liquid delivery pump 92, that is, while being diluted, and is introduced into the preprocessing column 19 via the 6-port 2-position valve 16. The components (sample components) in the sample are adsorbed in the preprocessing column 19. Unnecessary components which were not adsorbed by the preprocessing column 19 are drained through the 6-port 2-position valve 16 together with the sample introduction solution.

After adsorbing the sample components in the preprocessing column 19, the flow path of the 6-port 2-position valve 16 is switched (switched to the flow path connection state by rotating by 60 degrees from the state shown in FIG. 1) so that the mobile phase is sent from the mobile phase supply unit 11 to the preprocessing column 19. By this mobile phase, the sample components in the preprocessing column 19 are eluted. The sample components eluted from the preprocessing column 19 are introduced into the analysis column 17 through the 6-port 2-position valve 16, and separated and eluted for each component. The sample components sequentially eluted from the analysis column 17 are sent to the detection unit 101 through the 8-port 7-position valve 100 and measured. The 8-port 7-position valve 100 is a valve having seven ports provided at the outer peripheral portion and one port provided at the center portion, and is configured to selectively connect the port provided at the center to one of the ports provided at the outer peripheral portion and form a flow path communicating the other ports provided at the outer peripheral portion. The six ports provided at the outer peripheral portion are connected to the outlet side flow paths of the analysis columns of the measurement blocks 10 to 60. The remaining one waste liquid flow path is connected to a waste liquid flow path. One port provided at the central portion is connected to the detection unit 101.

While measuring the sample with the measurement block 10 as described above, in the other measurement blocks 20 to 60, a mobile phase may be sent from the mobile phase supply unit 21 (not shown other than in the measurement block 20) to the analysis column 27 (not shown other than in the measurement block 20) to equilibrate the inside of the analysis column 27. The equilibration of the analysis column 27 can be simultaneously performed in all the measurement blocks 20 to 60 (standby measurement blocks) other than the measurement block 10 in which a measurement is being performed. The mobile phases that passed through the analysis columns 27 of the measurement blocks 20 to 60 are drained through the 8-port 7-position valve 100.

In the measurement blocks 20 to 60 other than the measurement block 10 which is measuring the sample, it may be configured to perform processing of introducing a sample from the autosampler 70 and adsorbing it in the preprocessing column 29, or processing of washing the sample introduction flow path from the autosampler 70 to each measurement block 20 with a cleaning solution contained in the liquid container 94 and sent by the liquid delivery pump 95. However, in the configuration of this embodiment, since a common flow path is used for the measurement blocks 10 to 60 for introducing the sample, the processing of introducing the sample and the cleaning of the flow path used for introducing the sample can be executed only in any one of the standby measurement blocks 20 to 60.

Of course, it may be configured such that flow paths for introducing samples into respective measurement blocks 10 to 60.

Figure 2:
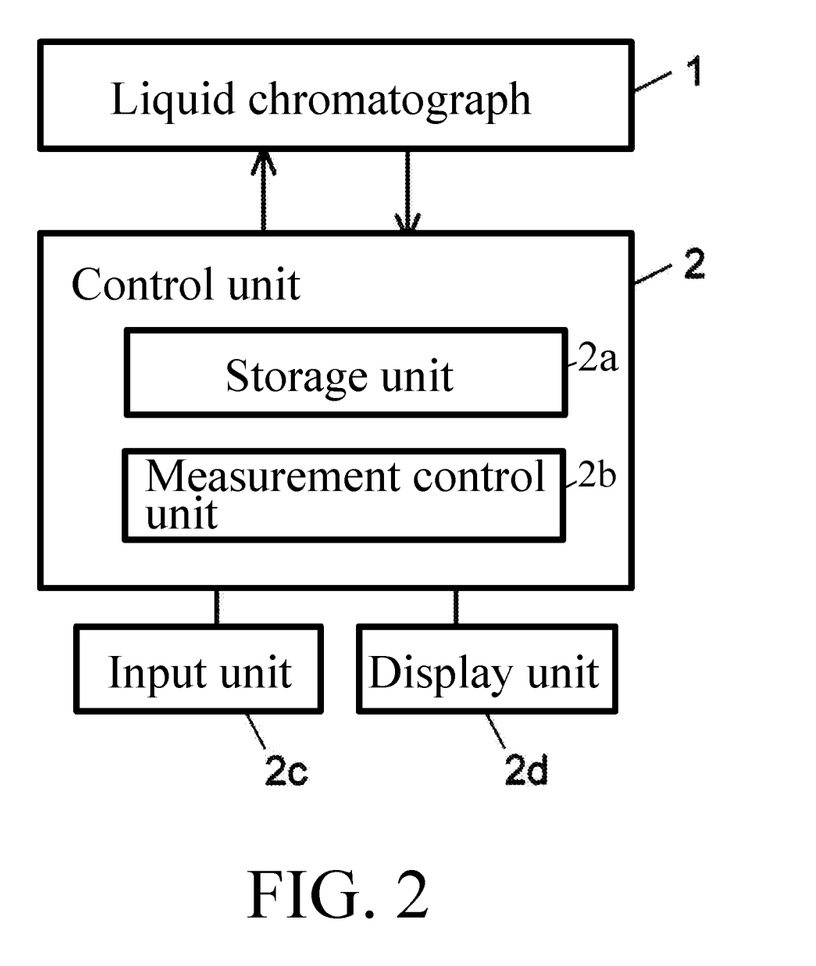
FIG. 2 illustrates a control unit of the liquid chromatograph of this embodiment.

As shown in FIG. 2, the liquid chromatograph 1 is connected to the control unit 2, and the liquid feeding operation of each liquid delivery pump and the flow path switching operation of each valve are controlled by the control unit 2. The control unit 2 is equipped with a storage unit 2a and a measurement control unit 2b which is a functional block. The entity of the control unit 2 is a general computer, and the measurement control unit 2b is realized by making the CPU execute an appropriate program. Further, the input unit 2c and the display unit 2d are connected to the control unit 2.

Figure 3:
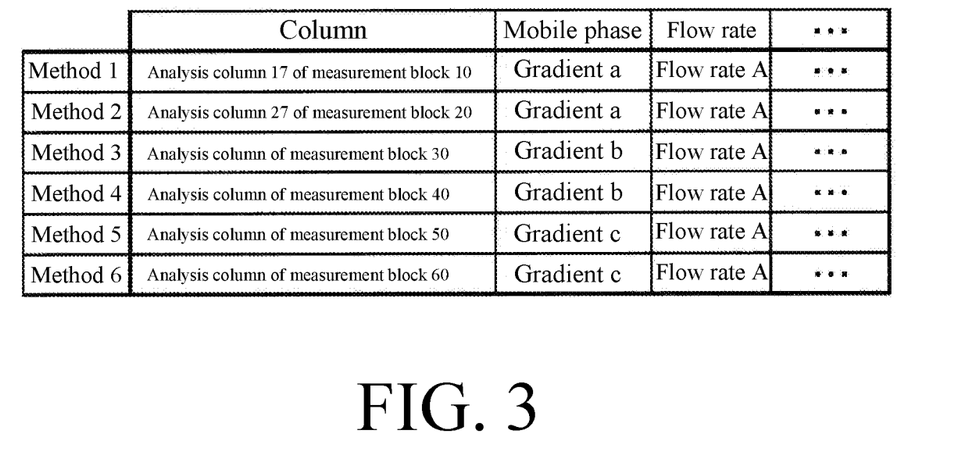
FIG. 3 is an example of a method file used in the liquid chromatograph of this embodiment.
Figure 4:
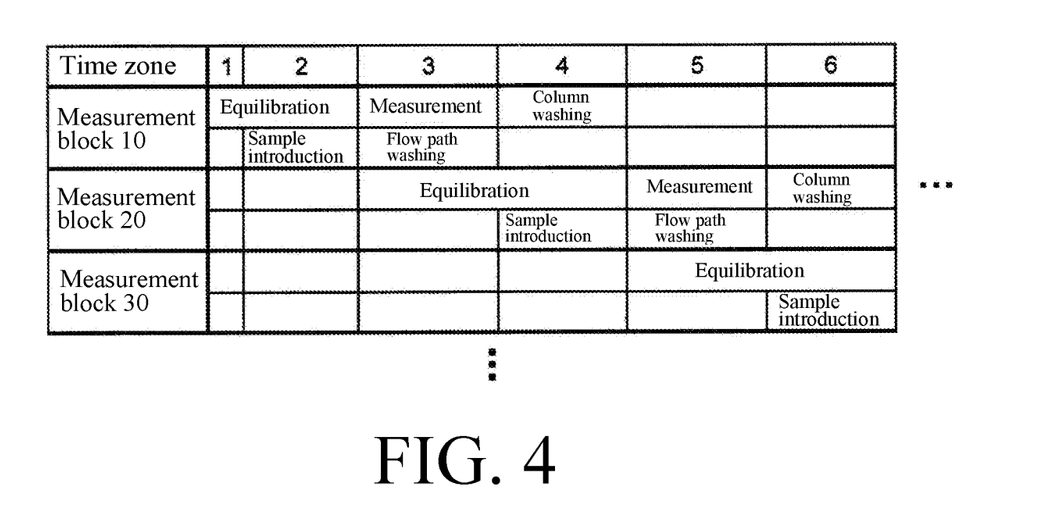
FIG. 4 is a diagram for explaining the flow when executing the method file of FIG. 3 in the liquid chromatograph of this embodiment.

In the liquid chromatograph of this embodiment, a user creates a method file describing a plurality of measurement conditions to be executed successively, and stores it in the storage unit 2a in advance. In this method file, for example, as shown in FIG. 3, measurement conditions for performing a gradient analysis using analysis columns of the measurement blocks 10 to 60 one by one are described (the actual measurement conditions appropriately includes parameters other than the column and the mobile phase to be used). In the gradient analysis, equilibration, measurement, and washing of the analysis column are carried out in order. In the liquid chromatograph of this embodiment, the flow of sequentially measuring a sample using the measurement conditions will be described with reference to FIG. 4. In FIG. 4, only time zones 1 to 6 for executing various operations are described in the measurement blocks 10 to 30, and descriptions of the subsequent time zones and the measurement blocks 40 to 60 are omitted.

When a user instructs a measurement start, the measurement control unit 2b reads out a method file from the storage unit 2a. Then, the analysis column 17 is equilibrated by introducing a mobile phase of a mixing ratio (initial mixing ratio) at the time of the measurement start in the gradient analysis (gradient a) to the analysis column 17 of the measurement block 10 set as the first measurement (Equilibration: Time zones 1 to 2). After the start of equilibration of the analysis column 17, sample components are introduced into a preprocessing column 19 after a predetermined time has elapsed (Sample introduction: Time Zone 2).

Upon completion of equilibration of the analysis column 17 and introduction of a sample into the preprocessing column 19, the flow path connection state of the 6-port 2-position valve 16 is switched. Then, the mobile phase is sent from the mobile phase supply unit 11 to the preprocessing column 19 to elute the sample components from the preprocessing column 19 and introduced to the analysis column 17 to perform the measurement (Measurement: Time zone 3). In parallel with the measurement of the sample components, the flow path connection state of the 8-port 7-position valve 73 and the 8-port 7-position valve 83 is switched. Then, the cleaning solution contained in the liquid container 94 is sent to a flow path passing through the 6-port 2-position valve 15, the 8-port 7-position valve 83, the autosampler 70, and the 8-port 7-position valve 73 to wash the sample introduction flow path (Flow path washing: Time zone 3). At this time, it may be configured such that the cleaning solution is discharged to the drain of the 8-port 7-position valve 73 and that the flow path passing the 6-port 2-position valve 15 and the 6-port 2-position valve 16 is also washed to drain the cleaning solution.

In the Time zone 3, in parallel with performing the aforementioned operation in the measurement block 10, equilibration of the analysis column 27 in the measurement block 20 is started (Equilibration: Time zones 3 to 4).

After completion of measuring the sample in the measurement block 10, the flow path connection state of the 8-port 7-position valve 100 is switched to connect the analysis column 17 of the measurement block 10 to the drain and also connect the analysis column 27 of the measurement block 20 to the detector. Then, in the measurement block 10, a mobile phase is sent from the mobile phase supply unit 11 to the preprocessing column 19 and the analysis column 17. With this, both columns are washed (Column washing: Time zone 4). In parallel with this, a sample is introduced in the preprocessing column 29 of the measurement block 20 (Sample introduction: Time zone 4).

Upon completion of the equilibration of the analysis column 27 in the measurement block 20 and the introduction of the sample into the preprocessing column 29, the measurement is started at the measurement block 20 (Measurement: Time zone 5). In parallel with this, the washing of the sample introduction flow path communicating to the measurement block 20 and the equilibration of the analysis column in the measurement block 3 are performed.

Hereinafter, in the same manner as described above, the measurement control unit 2b sequentially performs equilibration of a column, introduction of a sample, and measurement, washing of a flow path, and washing of a column in each measurement block. After measuring the sample using the measurement block 60, the analysis column of the measurement block 60 is washed and the operation of each part is stopped.

In a conventional liquid chromatograph, a mobile phase cannot be sent to other analysis columns during the measurement of a sample using one analysis column. For this reason, after switching the analysis column to be used, there is no choice to repeatedly perform equilibration of the analysis column and measurement of the sample one by one in order. Especially in a gradient analysis, it takes time for the equilibration. In contrast to the above, in the liquid chromatograph of this embodiment, in parallel with the measurement of the sample and the washing of the column in the measurement block 10, the analysis column 27 of the measurement block 20 to be used next can be equilibrated. Therefore, the throughput of the measurement is improved.

It should be noted that the aforementioned example is merely an example and can be appropriately changed in accordance with the spirit of the present invention.

In the aforementioned embodiment, it is configured such that six measurement blocks are provided. However, this number can be appropriately changed. Further, it is possible to appropriately change the configuration in the measurement block and other channel configurations. Furthermore, although the type of the detector 101 is not specified in the aforementioned embodiment, conventionally used various detectors (mass spectrometer, absorptometer, etc.) can be used.

The combination of the operations in each measurement block described with reference to FIG. 4 in the aforementioned embodiment is one example, and executable operations can be appropriately combined from the flow path configuration. For example, the operation to wash the column 19 by sending a cleaning solution accommodated in the liquid container 94 to the flow path passing the 6-port 2-position valve 15 and the 6-port 2-position valve 16 in the measurement block 1 and the operation of introducing a sample in the measurement block can be combined.

In the aforementioned embodiment, the configuration in which preprocessing of a sample is performed using the preprocessing column 19, the sample introduction solution is diluted with the diluent contained in the liquid container 91, or a flow path and a column are washed by a cleaning solution contained in the liquid container 94 is explained. However, this is merely one of preferred embodiments and it can be configured without including them. In this case, for example, the 6-port 2-position valve 16, the flow path connecting portion 18, etc., are unnecessary.

DESCRIPTION OF REFERENCE SYMBOLS 1 liquid chromatograph
10 to 60 measurement block
101 detection unit
11, 21 mobile phase supply unit
110 measurement block
111 flow path connecting portion
112a to 112f analysis column
113 autosampler
12a, 12b, 22a, 22b, 81, 91, 94 liquid container
13a, 13b, 23a, 23b, 82, 92, 95 liquid delivery pump
14 mixer
15, 16, 25, 26, 71 6-port 2-position valve
17, 27, 112a to 112f analysis column
18, 28, 111 flow path connecting portion
19, 29 preprocessing column
2 control unit
2a storage unit
2b measurement control unit
2c input unit
2d display unit
70 autosampler
72 injection port
73, 83 8-port 7-position valve
93, 96 7-port 6-position valve
100, 100' 8-port 7-position valve

The invention claimed is:

1. A liquid chromatograph comprising:
a plurality of measurement blocks which are three or more measurement blocks, and a plurality of columns, each measurement block of the plurality of measurement blocks comprising:
a column of the plurality of columns, and
a dedicated mobile phase supply unit, the dedicated mobile phase supply unit configured to supply a predetermined solution to the inlet side flow path of the column;
a sample injection unit capable of selectively injecting a sample into one of the inlet side flow paths of the plurality of columns;
a flow path switching unit disposed on exit sides of the plurality of columns and configured to selectively connect one of outlet side flow paths of the plurality of columns to a flow path connected to a detector arranged on a downstream side of the flow path switching unit and connect outlet side flow paths of other columns to a waste liquid flow path;
a measurement control unit configured to measure, using the detector, a sample component eluted from a first column of a first measurement block of the plurality of measurement blocks, while a second column of a second measurement block of the plurality of measurement blocks is equilibrated or washed, and
a second flow path switching unit disposed on the inlet side of each of the plurality of measurement blocks and associated with a respective dedicated mobile phase supply unit, wherein the sample injection unit is commonly provided for the plurality of columns, and wherein each second flow path switching unit is configured to selectively introduce one of the mobile phase from the associated respective dedicated mobile phase supply unit and a liquid containing the sample.

2. The liquid chromatograph as recited in claim 1, further comprising:

a storage unit in which a plurality of measurement conditions for measuring a sample by alternatively using the plurality of columns is stored, wherein the measurement control unit is further configured to sequentially read out the plurality of measurement conditions from the storage unit, control the flow path switching unit so as to connect the outlet side flow path of the column used in the measurement condition to a flow path connected to the detector, and control the sample injection unit so as to inject a sample into the inlet side flow path of the column.

3. The liquid chromatograph of claim 1, wherein the measurement control unit is further configured to implement washing of the sample injection unit while a sample component eluted from the first column of the plurality of columns is measured by the detector.

4. The liquid chromatograph of claim 1, wherein a first mobile phase supply unit is arranged to supply a mobile phase to the first column of the plurality of columns; and wherein the measurement control unit is further configured to introduce a mobile phase into the first column and wash the first column of the plurality of columns while the second column of the plurality of columns is being equilibrated.

5. The liquid chromatograph of claim 1, wherein the flow path switching unit is a flow path switching valve having a plurality of peripheral ports and one common port, and is configured to selectively connect the common port to one of the plurality of peripheral ports and to form a flow path communicating with the other peripheral ports, and wherein the outlet side flow paths of the plurality of columns and the waste liquid flow path are connected to the plurality of the peripheral ports and the detector is connected to the common port.

6. The liquid chromatograph of claim 1, wherein each measurement block of the plurality of measurement blocks includes a plurality of columns.

7. A liquid chromatograph comprising:

a plurality of measurement blocks including three or more measurement blocks, each measurement block including a respective analysis column of a plurality of analysis columns including three or more analysis columns;

a dedicated mobile phase supply unit provided for each measurement block of the plurality of measurement blocks and at an inlet side flow path of an analysis column of a respective measurement block, each dedicated mobile phase supply unit configured to supply a predetermined solution;

a sample injection unit capable of selectively injecting a sample into one of the inlet side flow paths of the plurality of analysis columns;

a flow path switching unit disposed on exit sides of the plurality of analysis columns and arranged to selectively connect one of outlet side flow paths of the plurality of analysis columns to a flow path connected to a detector arranged on a downstream side of the flow path switching unit and connect outlet side flow paths of other analysis columns to a waste liquid flow path;

a plurality of valves and liquid containers arranged to allow sample components eluted from a first analysis column of the plurality of analysis columns, the first analysis column corresponding to a first measurement block of the plurality of measurement blocks, to be measured by the detector, while a second analysis column of the plurality of analysis columns is being equilibrated; and a second flow path switching unit disposed on the inlet side of each of the plurality of measurement blocks and associated with a respective dedicated mobile phase supply unit, wherein the sample injection unit is commonly provided for the plurality of analysis columns, and wherein the second flow path switching unit is configured to selectively introduce one of the predetermined solution and a liquid containing the sample.

8. The liquid chromatograph as recited in claim 7, further comprising:

a storage unit in which a plurality of measurement conditions for measuring a sample by alternatively using the plurality of analysis columns is stored; and a measurement control unit configured to sequentially read out the plurality of measurement conditions from the storage unit, control the flow path switching unit so as to connect the outlet side flow path of the analysis column used in the measurement condition to a flow path connected to the detector, and control the sample injection unit so as to inject a sample into the inlet side flow path of the analysis column.

9. The liquid chromatograph of claim 7, further comprising:

a set of valves arranged in association with a cleaning solution container to allow the sample injection unit to be washed while sample components eluted from the first analysis column of the plurality of analysis columns is measured by the detector.

10. The liquid chromatograph of claim 7, wherein a first mobile phase supply unit is arranged to supply a mobile phase to the first analysis column of the plurality of analysis columns; and further comprising a set of valves arranged in association with the first mobile phase supply unit to allow a mobile phase to enter and wash the first analysis column of the plurality of analysis columns while the second analysis column of the plurality of analysis columns is being equilibrated.

11. The liquid chromatograph of claim 7, wherein each measurement block of the plurality of measurement blocks includes a plurality of columns.

* * * * *